Oct. 15, 1968   DE FOREST D. BUTLER ET AL   3,405,834
CONVERTIBLE JUNCTION BOX FOR UNDERFLOOR WIRING DUCT
Filed May 15, 1967                                   4 Sheets-Sheet 1
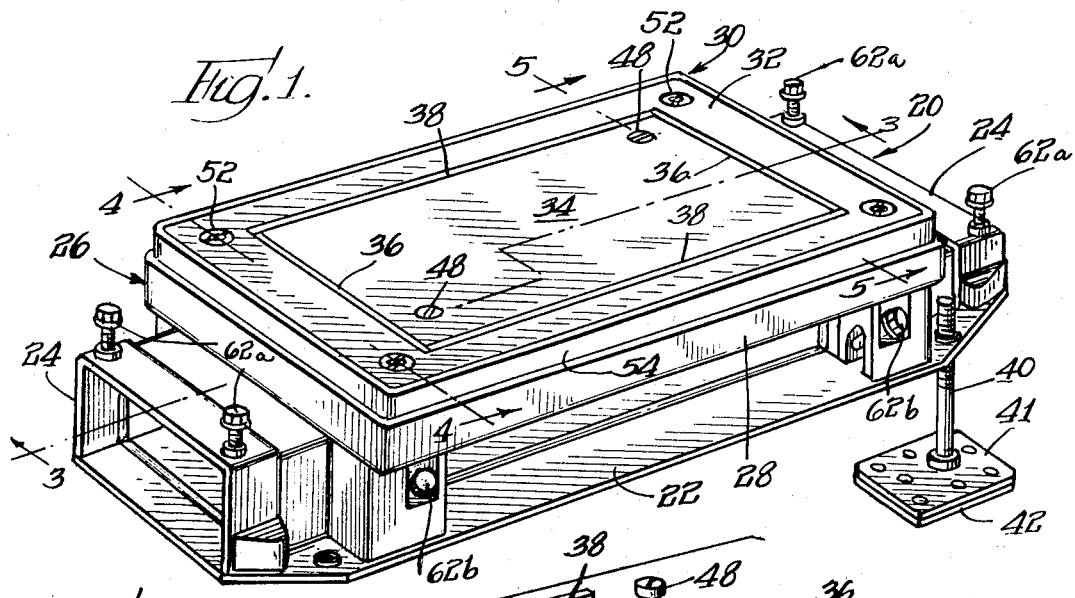
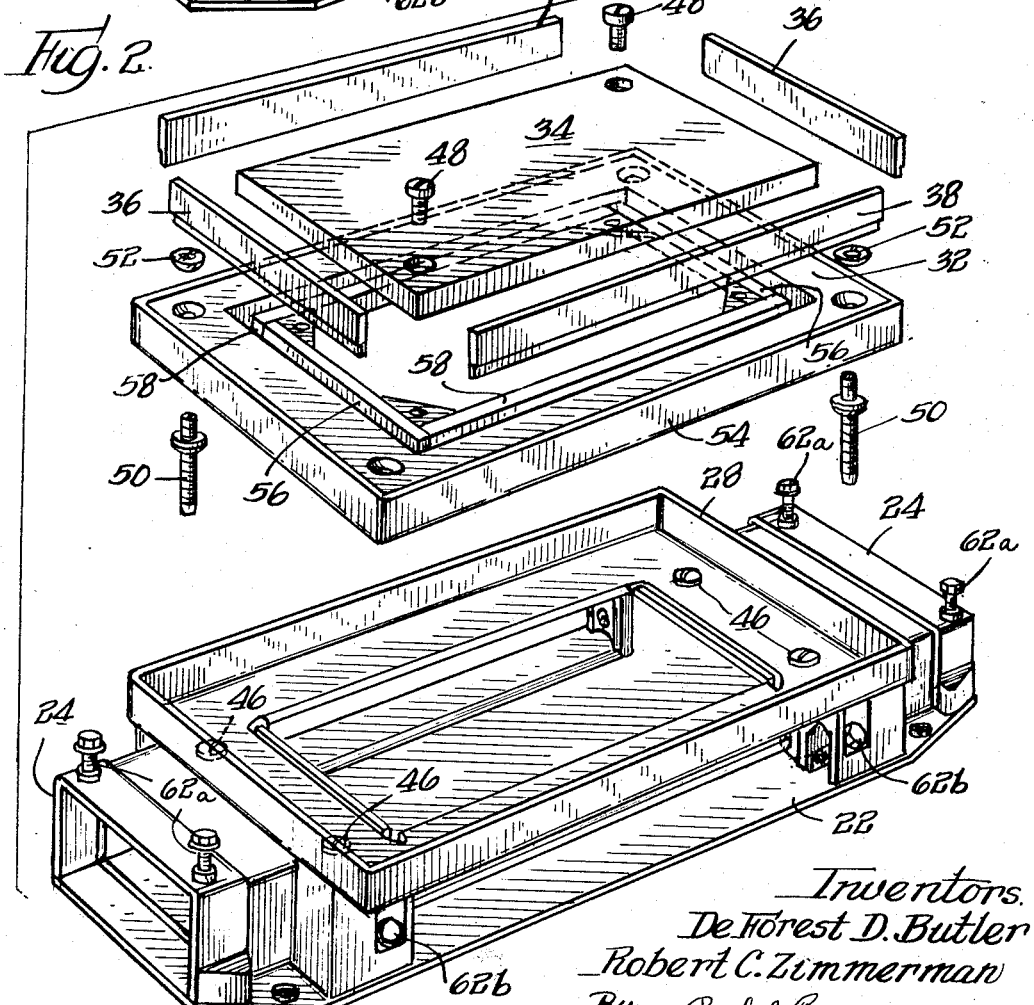
Inventors.
De Forest D. Butler
Robert C. Zimmerman
By: Paul J. Rose
Atty.

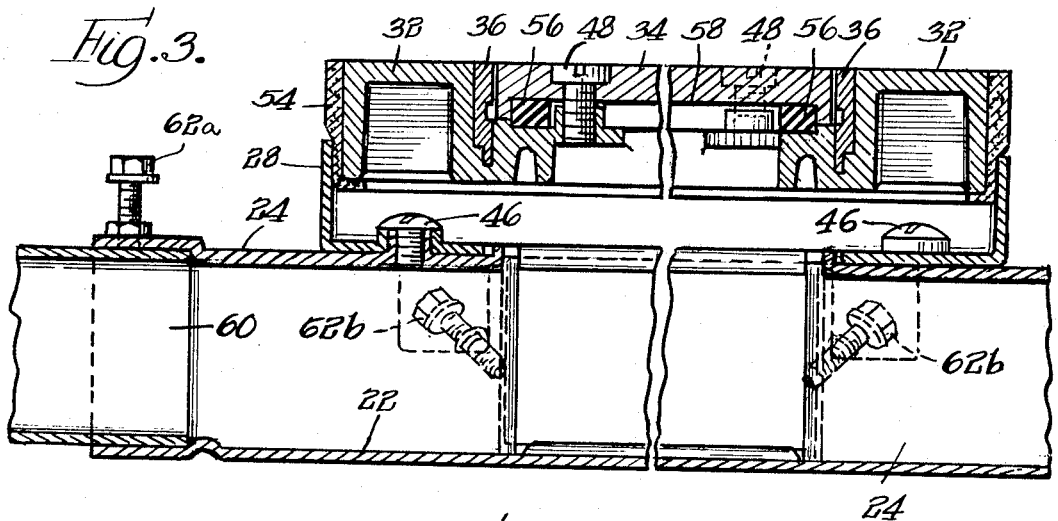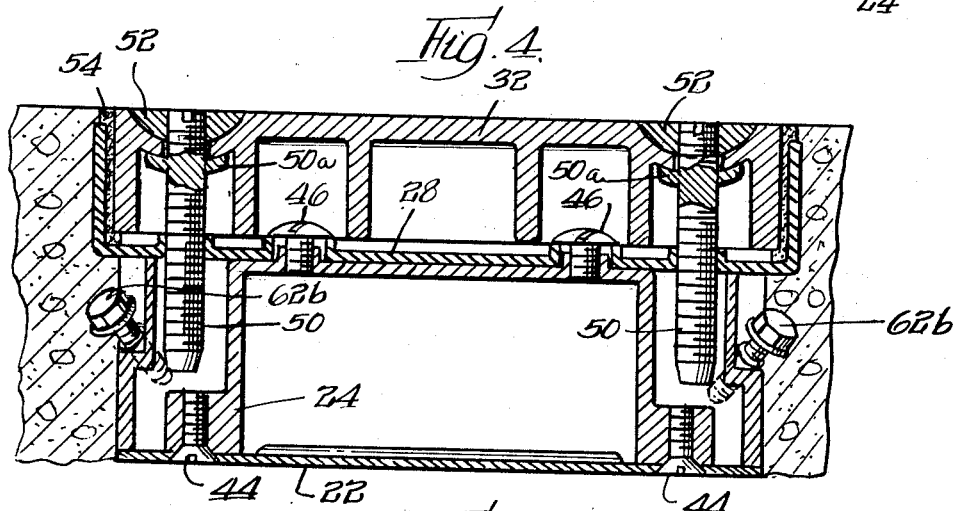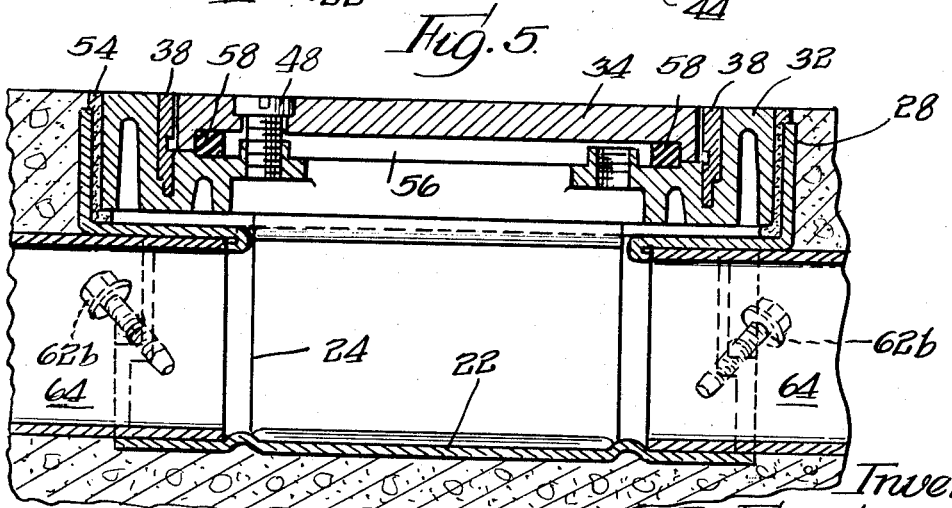

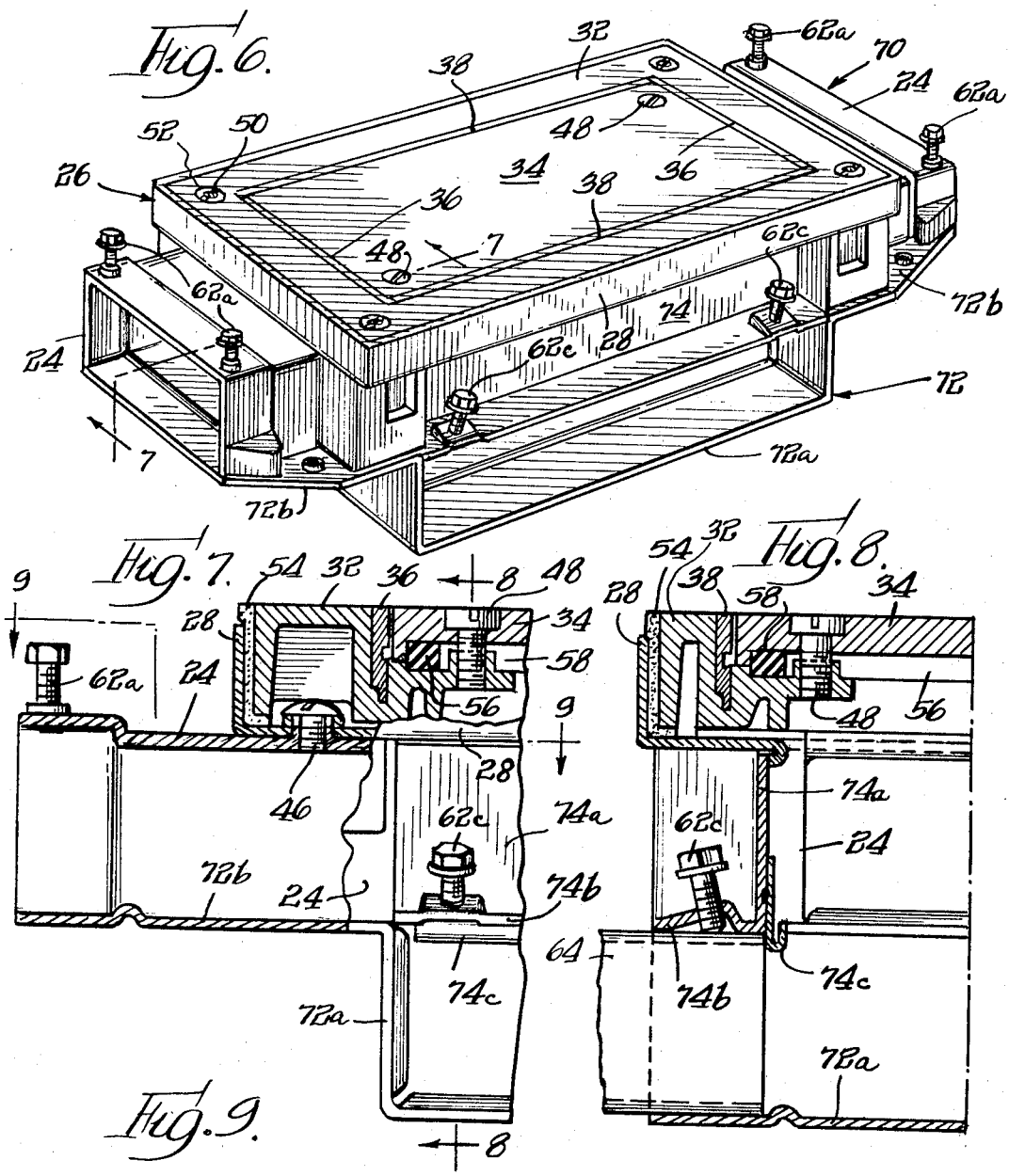

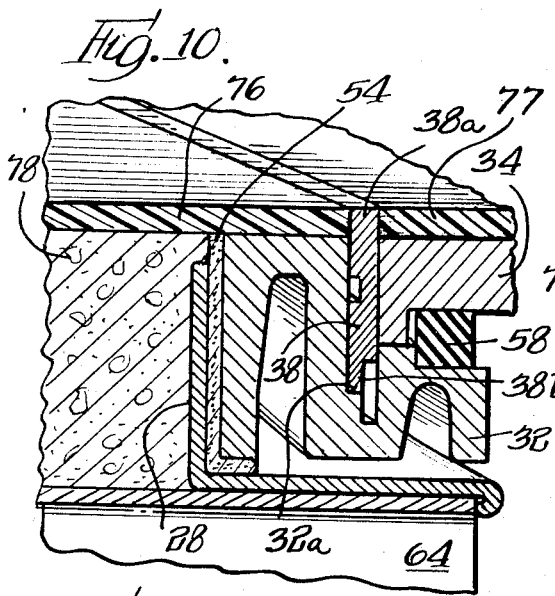
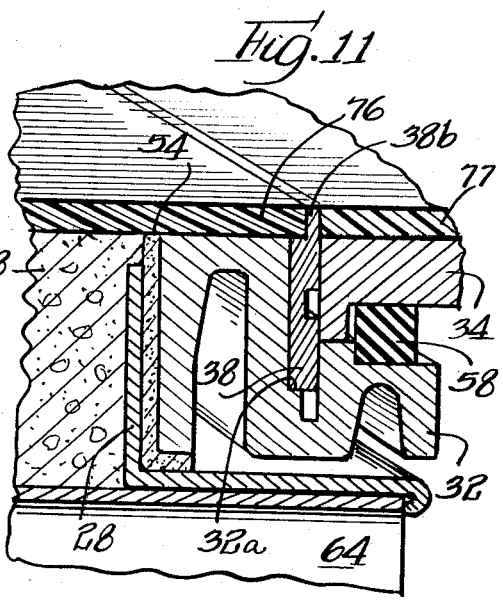
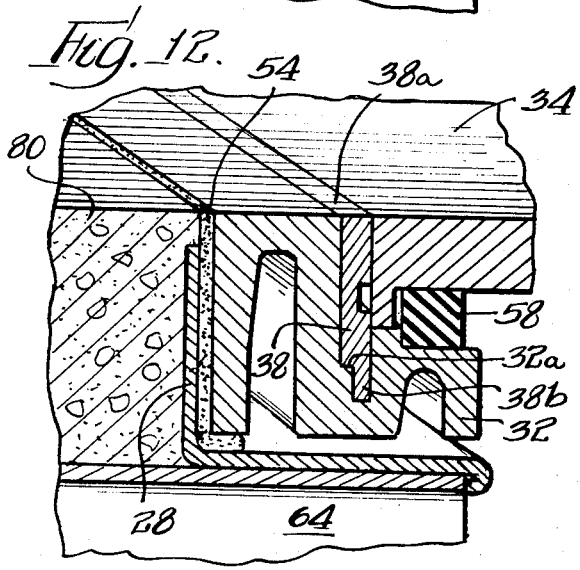
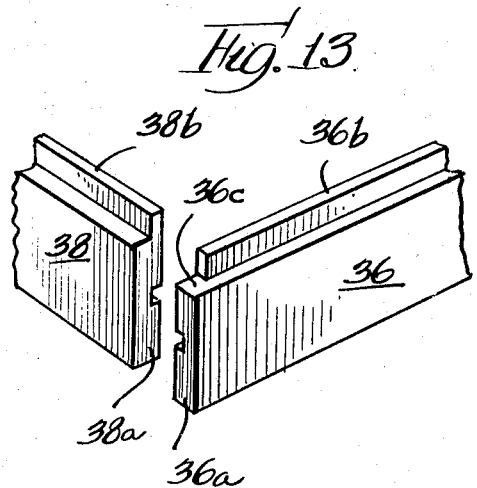
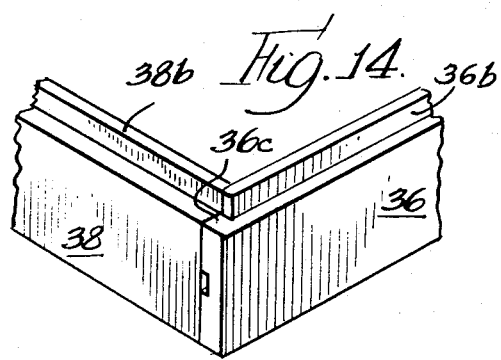

United States Patent Office 3,405,834
Patented Oct. 15, 1968

3,405,834
CONVERTIBLE JUNCTION BOX FOR UNDERFLOOR WIRING DUCT
De Forest D. Butler, Lexington, Ky., and Robert C. Zimmerman, San Jose, Calif., assignors to Square D Company, Park Ridge, Ill., a corporation of Michigan
Filed May 15, 1967, Ser. No. 638,442
11 Claims. (Cl. 220—3.4)

ABSTRACT OF THE DISCLOSURE

A junction box for underfloor wiring duct, certain parts being usable in both single-level and two-level junction boxes. A cover ring, tile trim, and cover plate assembly of the junction box includes a four-piece tile trim usable in two ways alternatively to provide two different thicknesses of tile trim, or in a third way when no tile trim is desired.

SUMMARY OF THE INVENTION

This invention relates to single-level and two-level junction boxes for underfloor wiring duct. The single-level box includes a generally flat sheet steel base plate, a pair of identical duct-receiving members or castings, and an access unit including a box and a cover ring, cover plate, and tile trim assembly. The single-level box may be converted to a two-level box by the addition of two filler plates and the substitution of a different base member for the generally flat base plate of the single-level box, the different base member having a channel-shaped portion for the reception of duct at a lower level. The cover ring, tile trim, and cover plate assembly includes a four-piece tile trim, each piece being an elongated flat strip having a flat longitudinal edge and an opposite stepped longitudinal edge and being receivable in a stepped recess in the cover ring in three different ways. In one way, when no tile is to be installed, a projecting portion of the stepped edge is disposed in a deeper part of the recess and the flat edge is flush with the cover ring and cover plate. In another way, when a thick tile trim is desired, the projecting portion of the stepped edge engages a shoulder defining a shallower part of the recess, and the flat edge forms the tile trim. In a third way, when a thin tile trim is desired, the flat edge engages a shoulder defining the shallower part of the recess, and the projecting portion of the stepped edge forms the tile trim.

BRIEF DESCRIPTION OF THE DRAWINGS

FIG. 1 is a perspective view of a single-level junction box constructed in accordance with the invention, a cover ring, tile trim, and cover plate assembly being shown in a raised position;

FIG. 2 is an exploded perspective view of the junction box of FIG. 1;

FIG. 3 is a fragmentary sectional view taken generally along the line 3—3 of FIG. 1, certain portions being broken away, and a portion of a wiring duct being shown;

FIG. 4 is a sectional view taken generally along the line 4—4 of FIG. 1, but showing the cover ring, tile trim, and cover plate assembly in a lowered position and including portions of concrete floor;

FIG. 5 is a sectional view taken generally along the line 5—5 of FIG. 1, but showing the cover ring, tile trim, and cover plate assembly in a lowered position and including portions of wiring duct and concrete floor;

FIG. 6 is a perspective view of a two-level junction box constructed in accordance with the invention;

FIG. 7 is a fragmentary sectional view taken generally along the line 7—7 of FIG. 6, certain portions being shown in full;

FIG. 8 is a fragmentary sectional view taken generally along the line 8—8 of FIG. 7, a portion of a wiring duct being shown;

FIG. 9 is a fragmentary top plan view taken generally along the line 9—9 of FIG. 7, an access unit of the junction box being removed;

FIG. 10 is a fragmentary sectional perspective view of the junction box of FIG. 1, showing a tile trim piece installed in a cover ring in a way providing a thick tile trim;

FIG. 11 is a fragmentary sectional perspective view similar to FIG. 10, but showing the tile trim piece installed in the cover ring in a way providing a thin tile trim;

FIG. 12 is a fragmentary sectional perspective view similar to FIG. 10, but showing the tile trim piece installed flush with the cover ring, as when no tile is to be laid over a concrete floor;

FIG. 13 is a fragmentary perspective view of one end portion of one piece of tile trim and an opposite end portion of an adjacent piece of tile trim of the junction box of FIGS. 1 or 6; and FIG. 14 is a view similar to FIG. 13, but showing how the pieces fit together when installed in the manner shown in FIG. 11.

DESCRIPTION OF THE PREFERRED EMBODIMENTS

FIG. 1 shows a single-level junction box 20 constructed in accordance with the invention and including a generally flat base plate 22, a pair of identical duct-receiving members 24 which preferably are castings, and an access unit 26. The access unit 26 includes a box 28 and a cover ring, tile trim, and cover plate assembly 30. The assembly 30 includes a rectangular cover ring 32 best shown in FIG. 2, a rectangular cover plate 34, and a four-piece tile trim including two short pieces 36 and two long pieces 38.

The base plate 22 is adjustably mounted on four screws 40, only one of which is shown (FIG. 1). Each screw 40 is slotted at its upper end and has a lower head portion (not shown) rotatably trapped between a pair of plate members 41 and 42 secured together in any suitable manner.

The castings 24 are secured respectively to opposite end portions of the base plate 22, each being secured by a plurality of screws 44 (FIG. 4). Opposite end portions of the box 28 are secured respectively to the castings 24 by pairs of screws 46. The cover plate 34 is removably secured to the cover ring 32 by a pair of screws 48. The cover ring 32 is adjustably mounted in the box 28 by four leveling screws 50 threaded through the bottom of the box 28. Each casting 24 loosely receives and conceals the inner end portions of a pair of the screws 50, as best shown in FIG. 4. Each screw 50 has an integral collar portion 50a against which a respective portion of the cover ring 32 is secured by a slotted round nut 52.

A foam rubber gasket 54 is adhesively secured to the cover ring 32. Gasket material between the cover ring 32 and the cover plate 34 is provided in the form of two short rubber strips 56 and two long rubber strips 58 adhesively secured to the cover ring 32.

Each casting 24 in conjunction with a respective end portion of the base plate 22 is adapted to receive an end portion of a relatively small underfloor wiring duct, such as a duct 60 shown in FIG. 3, and each casting 24 is provided with a pair of screws 62a for establishing a good electrical connection between the duct 60 and the casting 24 as part of a grounding system.

A paid of relatively large underfloor wiring ducts, such as a pair of ducts 64 shown in FIG. 5, are adapted to be received respectively on opposite sides of the junction box 20 between the castings 24 and between the base plate 22 and the box 28. Each casting 24 is provided with a second pair of screws 62b for establishing good electrical connections between the castings 24 and the ducts 64 as part of a grounding system.

FIGS. 6–9 show a two-level junction box 70 constructed in accordance with the invention, the parts of the junction box 70 which are identical with parts of the junction box 20 being identically numbered and therefore not again described hereinafter.

In the junction box 70, the generally flat base plate 22 of the junction box 20 is replaced by a base 72 having a channel-shaped portion 72a and a pair of flange portions 72b extending outwardly respectively from the free end portions of the sides of the channel-shaped portion 72a. The channel-shaped portion 72a is adapted to receive the relatively large ducts 64 on a lower level than the relatively small ducts 60 receivable in the castings 24 secured respectively to the flange portions 72b.

A pair of enlongated generally L-shaped filler plates 74 are secured between the castings 24 respectively on opposite sides of the junction box 70. Each filler plate 74 includes a portion 74a closing the respective opening corresponding to that which exists between the castings 24 in the junction box 20, and a portion 74b which together with the channel-shaped portion 72a defines an opening for one of the ducts 64. Each portion 74a has a duct stop 74c secured thereto.

Thus the base 72 and the filler plates 74 constitute a collection of parts or kit to enable the junction box to be converted from a single-level box to a two-level box.

Each casting 24 is provided with a pair of recesses 24a, one of which is shown in FIG. 9, in which end portions of the portions 74a are respectively received. In addition, opposite end portion (not shown) of each portion 74b are trapped respectively between the castings 24 and the flange portions 72b. In the junction box 70, the screws 62b in the castings 24 of the junction box 20 are replaced by screws 62c mounted in the portions 74b of the filler plates 74.

As best shown in FIGS. 10–14, each tile trim piece 38 is an elongated flat strip having a flat longitudinal edge portion 38a and an opposite stepped longitudinal edge portion 38b. Each of the short tile trim pieces 36 is similarly formed with a flat edge portion 36a and a stepped edge portion 36b, as best shown in FIGS. 13 and 14. The four tile trim pieces 36 and 38 are disposed in surrounding relationship to the cover plate 34 in a stepped moat-like recess defined by the cover ring 32 and peripheral edge portions of the cover plate 34.

In FIG. 10, the projecting portion of the stepped edge portion 38b of one of the tile trim pieces 38 is shown in engagement with a shoulder 32a defining a shallower part of the stepped recess in the cover ring 32, and the flat edge portion 38a projects above the upper surfaces of the cover ring 32 and the cover plate 34 to provide a thick tile trim for tile indicated at 76 and 77, the tile 76 being laid over concrete indicated at 78.

In FIG. 11, the flat edge portion 38a is shown in engagement with the shoulder 32a and the projecting portion of the stepped edge portion 38b projects above the upper surfaces of the cover ring 32 and the cover plate 34 to provide a thin tile trim for the tile indicated at 76 and 77.

In FIG. 12, the projecting portion of the stepped edge portion 38b is shown in engagement with the deeper part of the stepped recess in the cover ring 32, and the flat edge portion 38a is flush with the upper surfaces of the cover ring 32 and the cover plate 34, no tile being used on a concrete floor 80.

One end portion of the projecting portion of the stepped edge portion of each of the tile trim pieces 36 and 38 is cut away, as indicated at 36c for a tile trim piece 36 in FIGS. 13 and 14, to provide flush corners for the tile trim when the tile trim pieces are put together as indicated in FIG. 14.

We claim:

1. A single-level junction box for underfloor wiring duct, said single-level junction box being convertible to a two-level junction box and comprising a generally flat base plate, a pair of spaced duct-receiving members removably secured respectively to opposite end portions of said base plate, and an access unit including a box secured to said duct-receiving members, a generally rectangular cover ring adjustably mounted in said box, a rectangular cover plate removably secured to said cover ring, and a four-piece tile trim including four elongated flat tile trim pieces disposed in surrounding relationship to said cover plate, said cover ring and four peripheral edge portions of said rectangular cover plate defining a moat-like recess which surrounds said cover plate and in which said tile trim pieces are received, each of four portions of said moat-like recess respectively extending along said four peripheral edge portions of said rectangular cover plate having abutment means therein, each of said tile trim pieces having a flat longitudinal edge portion and an opposite stepped longitudinal edge portion and being receivable in a respective one of said four portions of said moat-like recess in three ways, namely, a first way in which a projecting portion of the stepped edge portion thereof engages an upper surface of the abutment means in the respective portion of the moat-like recess and the flat edge portion thereof projects above flat upper surfaces of said cover ring and cover plate to provide a relatively thick tile trim, a second way in which the flat edge portion thereof engages the upper surface of the abutment means in the respective portion of the moat-like recess and the projecting portion of the stepped edge portion thereof projects above the flat upper surfaces of said cover ring and cover plate to provide a relatively thin tile trim, and a third way in which the projecting portion of the stepped edge portion thereof projects below the upper surface of the abutment means in the respective portion of the moat-like recess and the flat edge portion thereof is substantially flush with the flat upper surfaces of said cover ring and cover plate.

2. A single-level junction box as claimed in claim 1 wherein a conversion kit is provided to convert said single level junction box to a two-level junction box by the substitution, for the base plate of the single-level junction box, of a base member having a channel-shaped portion and a pair of flange portions extending outwardly respectively from free end portions of opposed side wall portions of said channel-shaped portion and the addition of a pair of filler plates between said duct-receiving members and respectively on opposite sides of the junction box in such a manner that each of said filler plates and said channel-shaped portion of said base member defines a duct-receiving opening on a lower level than duct-receiving openings defined respectively by said duct-receiving members and said flange portions of said base member.

3. A single-level junction box for underfloor wiring duct, said single-level junction box being convertible to a two-level junction box and comprising a generally flat base plate, a pair of spaced duct-receiving members removably secured respectively to opposite end portions of said base plate, and an access unit including a box secured to said duct-receiving members, a generally rectangular cover ring adjustably mounted in said box, a rectangular cover plate removably secured to said cover ring, and a tile trim disposed in surrounding relationship to said cover plate, said cover ring and peripheral edge portions of said rectangular cover plate defining a moat-like recess which surrounds said cover plate and in which said tile trim is received, and a conversion kit whereby said single-level junction box is convertible to a two-level junction box by the substitution, for the base plate of the single-level junction box, of a base member having a channel-shaped portion and a pair of flange portions extending outwardly respectively from free end portions of opposed side wall portions of said channel-shaped portion and the addition of a pair of filler plates between said duct-receiving members and respectively on opposite sides of the junction box in such a manner that each of said filler plates and said channel-shaped portion of said base member defines a duct-receiving opening on a lower level than duct-receiving openings defined respectively by said duct-receiving members and said flange portions of said base member.

4. A single-level junction box as claimed in claim 3, wherein said duct-receiving members are castings.

5. A single-level junction box as claimed in claim 4, wherein each of said castings is provided with a grounding screw engageable with a duct receivable therein and with a pair of grounding screws respectively engageable with a pair of ducts receivable transversely therebetween from opposite sides of said junction box.

6. A cover ring, tile trim, and cover plate assembly for an underfloor wiring duct junction box, said assembly comprising a generally rectangular cover ring, a rectangular cover plate removably secured to said cover ring, and a four-piece tile trim including four elongated flat tile trim pieces disposed in surrounding relationship to said cover plate, said cover ring and four peripheral edge portions of said rectangular cover plate defining a moat-like recess which surrounds said cover plate and in which said tile trim pieces are received, each of four portions of said moat-like recess respectively extending along said four peripheral edge portions of said rectangular cover plate having abutment means therein, each of said tile trim pieces having a flat longitudinal edge portion and an opposite stepped longitudinal edge portion and being receivable in a respective one of said four portions of said moat-like recess in three ways, namely, a first way in which a projecting portion of the stepped edge portion thereof engages an upper surface of the abutment means in the respective portion of the moat-like recess and the flat edge portion thereof projects above the flat upper surfaces of said cover ring and cover plate to provide a relatively thick tile trim, a second way in which the flat edge portion thereof engages the upper surface of the abutment means in the respective portion of the moat-like recess and the projecting portion of the stepped edge portion thereof projects above the flat upper surfaces of said cover ring and cover plate to provide a relatively thin tile trim, and a third way in which the projecting portion of the stepped edge portion thereof projects below the upper surface of the abutment means in the respective portion of the moat-like recess and the flat edge portion thereof is substantially flush with the flat upper surfaces of said cover ring and cover plate.

7. An assembly as claimed in claim 6, in which the projecting portion of the stepped edge portion of each of said tile trim pieces is cut away adjacent one end of the tile trim piece to provide flush corners for the relatively thin tile trim when said tile trim pieces are received in said moat-like recess in said second way.

8. A single-level junction box for underfloor wiring duct, said junction box comprising a generally flat base plate, a pair of spaced duct-receiving members secured respectively to opposite edge portions of said base plate, and an access unit including an open-top box secured to said duct-receiving members and a cover closing the open-top of said box, each of said duct-receiving members together with said base plate defining a duct-receiving opening for a duct section extending in a first direction, and said pair of duct-receiving members together with said base plate and said box of said access unit defining a pair of opposed duct-receiving openings respectively for a pair of duct sections extending in a second direction transverse to said first direction.

9. A single-level junction box as claimed in claim 8, wherein said duct-receiving members are castings.

10. A single-level junction box as claimed in claim 8, wherein each of said duct-receiving members is provided with a grounding screw for a duct section extending in said first direction and with a pair of grounding screws respectively for a pair of duct sections extending in said second direction.

11. A single-level junction box as claimed in claim 8, wherein said cover is a cover ring, tile trim, and cover plate assembly.

References Cited

UNITED STATES PATENTS

| | | | |
|---|---|---|---|
| 1,533,759 | 4/1925 | Richardson et al. | 220—3.7 |
| 3,029,964 | 4/1962 | Hudson et al. | 220—3.4 |
| 3,061,663 | 10/1962 | Reiland | 220—3.3 X |
| 3,070,252 | 12/1962 | Reiland | 220—3.7 X |
| 3,081,896 | 3/1963 | Hoskins | 220—3.7 X |
| 3,104,774 | 9/1963 | Hudson et al. | 220—3.7 X |
| 3,338,450 | 8/1967 | Rose | 220—3.94 |

FOREIGN PATENTS 814,835  6/1959  Great Britain.

THERON E. CONDON, Primary Examiner.

J. R. GARRETT, Assistant Examiner.